United States Patent

Bishop

[15] 3,667,631

[45] June 6, 1972

[54] HYDRAULIC UTILITY LIFT FOR TRUCKS

[72] Inventor: Jerald W. Bishop, 1506 Highway 56, Dodge City, Kans. 67801

[22] Filed: Jan. 22, 1971

[21] Appl. No.: 108,777

[52] U.S. Cl. .......................................... 214/86 A, 254/124
[51] Int. Cl. .......................................... B66c 1/00, B66f 3/00
[58] Field of Search .................. 254/124; 214/86 A; 280/490, 280/490.1; 172/467

[56] References Cited

UNITED STATES PATENTS

| | | | |
|---|---|---|---|
| 2,625,279 | 1/1953 | Dalby | 214/86 A |
| 2,715,470 | 8/1955 | Marcus | 214/86 A |

*Primary Examiner*—Robert C. Riordon
*Assistant Examiner*—David R. Melton
*Attorney*—John A. Hamilton

[57] ABSTRACT

A hydraulic utility lift for pick-up trucks and other vehicles consisting of a frame adapted to be mounted under the rear portion of the truck bed and carrying a lift arm operable to lift a load disposed rearwardly of said truck as said arm is pivoted from a downwardly and rearwardly inclined position to a substantially horizontal position, a hydraulic ram for pivoting said arm, and a linkage operatively connecting said ram to said arm, said linkage having a novel arrangement whereby it both converts horizontal movements of said ram to vertical movement lifting said arm, whereby said ram may be elevated to preserve better ground clearance for said lift, and also provides a more uniform power ratio for said ram, permitting economies in the design of said ram.

8 Claims, 7 Drawing Figures

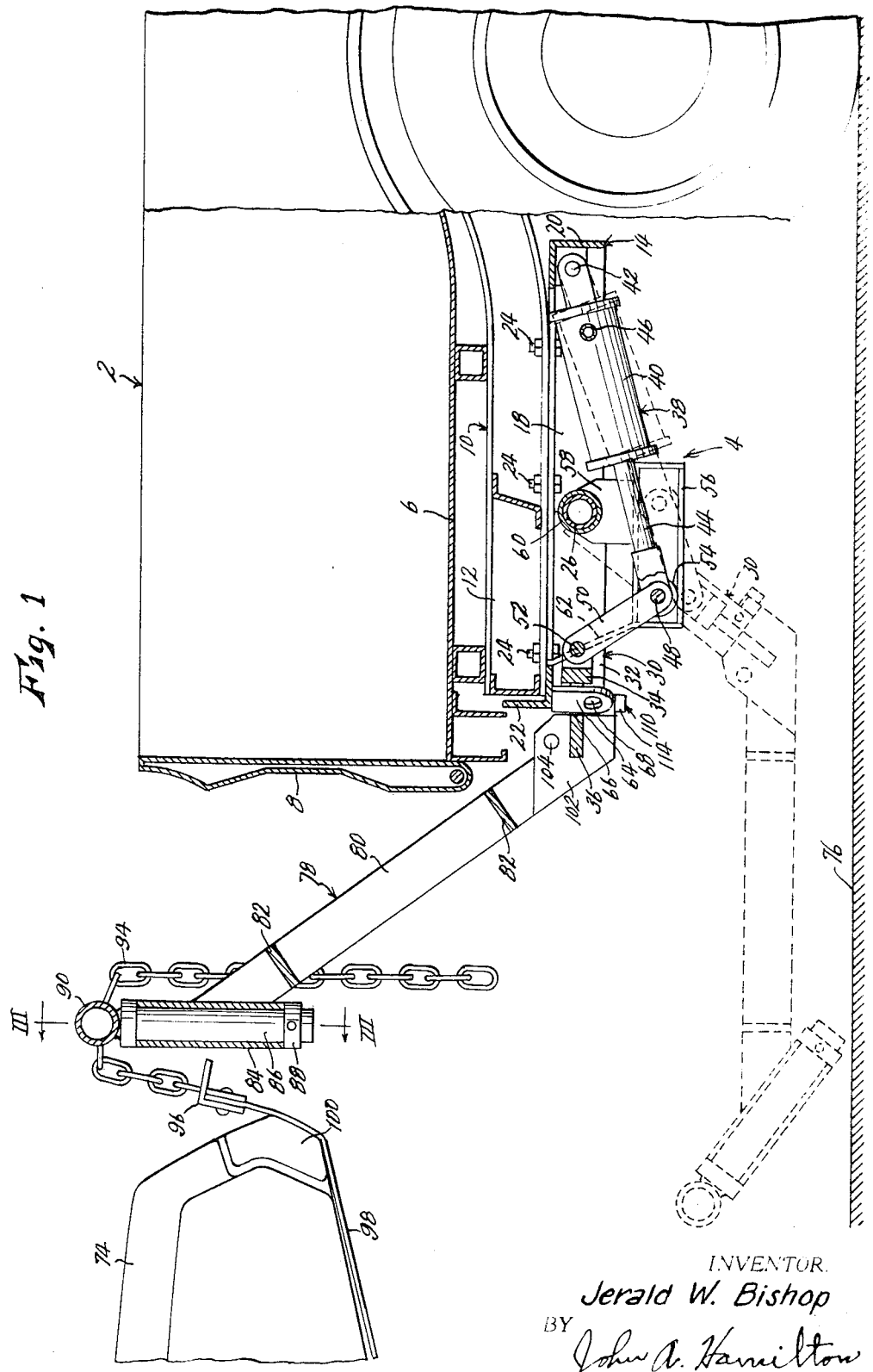

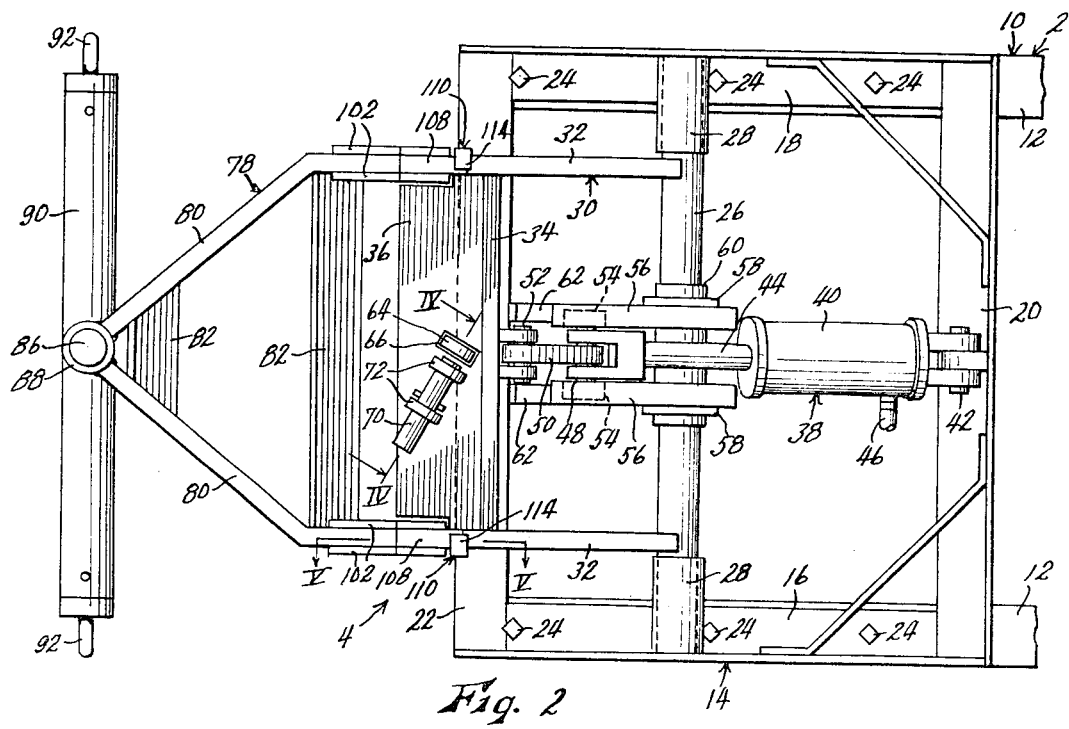

HYDRAULIC UTILITY LIFT FOR TRUCKS

This invention relates to new and useful improvements in hydraulic lifts, and has particular reference to a hydraulic lift especially adapted for use as a general utility lift for mounting on pick-up trucks and the like.

A primary object of the present invention is the provision of a hydraulic lift of the character described which is adapted to be mounted beneath the truck bed, leaving said bed completely unobstructed for normal usage, the actual work-engaging elements of the lift being disposed just rearwardly of the truck bed. As a further aid in permitting normal usage of the truck, the rearwardly projecting work-engaging elements are made readily detachable from the primary lift elements disposed beneath the truck bed. The work-engaging elements may consist of interchangeable devices for different purposes, that selected for illustration being a device for engaging one end of an automobile or the like to lift and tow said automobile in the manner of a tow truck. However, the lift will accept devices such as a boom and winch for loading heavy objects into the truck bed, or a bulldozer blade for levelling ground or clearing roadways of snow, or others, and it is to be understood that the primary invention resides in the lift itself, not in the particular tools, devices or work-engaging elements which may be carried thereby.

The placement of hydraulic lifts beneath the rearward portion of a truck bed is not in itself a new concept. However, all previous lifts of this type within my knowledge have been subject to certain shortcomings and disadvantages. For example, it is desirable that, despite the limited clearance between the truck frame and the ground, there be a good clearance maintained between the lift structure and the ground, in order to prevent possible damaging of the lift by contact with the road surface. Many lifts do not maintain a safe clearance in this respect, or are limited to use with trucks having an initially large ground clearance, due to the difficulties of maintaining a good working angle between the hydraulic ram powering the lift and the main lift arm operated by the ram. It is sometimes possible to raise both the lift arm and the ram to a safely elevated position to provide the desired ground clearance, but this usually results in an inefficiently acute working angle between the ram and the lift arm, so that the ram force exerts relatively little lifting force on the arm. As a result, the ram must be over-powered as compared to the load actually supported by the arm, either by enlarging the ram cylinder, or using higher hydraulic pressures, or both. Either alternative is of course expensive and needlessly wasteful of power. Accordingly, the present invention involves a novel relative placement of the ram and lift arm, and a linkage interconnecting these elements, whereby they may be elevated to positions directly beneath the truck frame to maintain a maximum ground clearance, but which at the same time maintains an efficient power ratio between the motions of the ram and the lift arm. It is possible with the present invention to provide a 1 to 1 ratio between the movements of the ram and the lift arm, although this ratio may not in most cases be the most desirable condition.

Other objects are simplicity and economy of construction, efficiency and dependability of operation, and adaptability for use in a wide variety of applications and usages.

With these objects in view, as well as other objects which will appear in the course of the specification, reference will be had to the accompanying drawing, wherein:

FIG. 1 is a longitudinal vertical sectional view of a hydraulic utility lift embodying the present invention, shown mounted on a fragmentarily illustrated pick-up truck, said lift being shown in its elevated position in solid lines, and in its lowered position in dotted lines, FIG. 2 is an inverted plan view of the lift as shown in solid lines in FIG. 1, with parts omitted, FIG. 3 is a fragmentary sectional view taken on line III—III of FIG. 1, FIG. 4 is an enlarged, fragmentary sectional view taken on line IV—IV of FIG. 2, the latch pin being shown disengaged in solid lines, and engaged in dotted lines, FIG. 5 is an enlarged, fragmentary sectional view taken on line V—V of FIG. 2, FIG. 6 is a fragmentary sectional view taken on line VI—VI of FIG. 5, and FIG. 7 is a fragmentary sectional view taken on line VII—VII of FIG. 5.

Like reference numerals apply to similar parts throughout the several views, and the numeral 2 applies generally to a pickup truck on which a hydraulic utility lift embodying the present invention and indicated generally by the numeral 4 may be mounted. The truck includes the usual bed 6, having a tail-gate 8, mounted on the truck frame 10, said frame including a pair of horizontal, parallel main chassis beams 12 extending longitudinally of the vehicle beneath bed 6, said beams terminating just forwardly of the rearward end of the truck bed.

The lift 4 includes a rectangular angle-iron frame 14 consisting of side rails 16 and 18, front rail 20, and rear rail 22, all rigidly joined together and disposed horizontally, with side rails 16 and 18 extending longitudinally of the truck and adapted to be affixed the chassis beams 12 of the truck frame, as by bolts 24, beneath said beams and below the rearward portion of truck bed 6. The vertical legs of the angle irons froming frame rails 16, 18, and 20 extend downwardly, while the vertical leg of the angle iron forming rear rail 22 projects upwardly just rearwardly of the rearward ends of beams 12.

A heavy shaft 26 extends horizontally and transversely between side rails 16 and 18 of frame 14, intermediate the forward and rearward ends of said frame, each end of said shaft being journalled in a socket 28 affixed to the associated side rail. Affixed to said shaft is a lift arm 30 consisting of a pair of parallel arms 32 affixed to and extending generally rearwardly from said shaft, a cross bar 34 extending between the rearward end portions of arms 32 parallel to shaft 26 and rigidly affixed to said arms, and a plate 36 also extending between arms 32 at the outer side of cross bar 34, said plate lying generally in the plane determined by arms 32 and being welded or otherwise fixed to cross bar 34 and arms 32. Lift arm 30 is adapted to be pivoted between a lowered position in which it is inclined downwardly and rearwardly from shaft 26, as shown in dotted lines in FIG. 1, and a raised position in which it extends horizontally rearwardly from shaft 26, as shown in solid lines in FIG. 1. When said arm is in its raised position, cross bar 34 is disposed directly beneath rear frame fail 22, and arms 32 extend rearwardly from said rail, to a position generally about flush with the rearward end of the truck bed.

Lift arm 30 is pivoted by a hydraulic ram 38 including a hydraulic cylinder 40 pivoted at its forward end, as at 42, to the midpoint of front rail 20 of frame 14, and extending rearwardly from said pivot. A piston (not shown) operatively mounted in said cylinder is affixed to a piston rod 44 which projects rearwardly from said cylinder. Said ram cylinder is provided with a hose 46 for admitting hydraulic fluid by means of which the ram may be extended, or exhausting said fluid to permit retraction of said ram. The pump for hydraulic fluid, which may be powered electrically or mechanically by the truck engine, and the necessary valving, may be standard as is well known in the art and is not shown.

The extended rearward end of piston rod 44 has a horizontal transverse pin 48 mounted therein. A link 50 has one end thereof pivoted on pin 48, and extends generally rearwardly thereof, having its rearward end pivoted, as at 52, to the forward face of cross bar 34, at the midpoint thereof. Mounted rotatably on each end of pin 48 is a roller 54, said rollers being engaged respectively in a pair of confronting, channel-shaped guides 56. Guides 56 are horizontal and extend longitudinally of the truck, being disposed in spaced relation below shaft 26. Each guide is supported by a leg 58 fixed to and depending from a sleeve 60 mounted on shaft 26, and in which said shaft is free to turn, said leg being affixed to said guide adjacent the forward end thereof, and by a leg 62 fixed at its lower end to the rearward end of said guide, and at its upper end to rear frame rail 22. Thus the guides are supported in fixed relation to frame 14, and in turn support rollers 54 for forward and rearward horizontal movement only. The proportions of the parts are such that when lift arm 30 is in its lowered position, as shown in dotted lines in FIG. 1, link 50 is generally aligned with hydraulic ram 38. When lift arm 30 is in its elevated position, as shown in solid lines in FIG. 1, the limit of the elevating movement of said arm being provided by the engagement of arms 32 with rear frame rail 22, link 50 is angled sharply, but still obtusely, with the ram.

To support lift arm 30 in its elevated position independently of the hydraulic ram, and thus to permit parking of the truck with all power systems off and with a load supported by the lift arm, there is provided a latch keeper bar 64 welded or otherwise affixed to rear frame rail 22 at the midpoint thereof, and depending therefrom to project through a hole 66 formed in plate 36 of the lift arm when said lift arm is fully elevated, said bar having a hole 68 formed horizontally therethrough which is disposed just beneath plate 36 when the lift arm is elevated. A latch pin 70 is disposed horizontally beneath plate 36 and is carried for longitudinal sliding movement in a pair of guides 72. As shown in FIG. 4, it will be seen that when lift arm 30 is elevated, latch pin 70 may be extended as shown in dotted lines to project through hole 68 of bar 64, whereby to lock the lift arm in its elevated position, or retracted from said hole to leave the lift arm supported solely by link 50 and ram 38.

Lift arm 30 of course carries the tool or other work-engaging elements to be elevated by the lift. While various tools or the like may be attached to the lift arm, the particular attachment selected for illustration is designed to adapt the truck 2 for use as a tow truck, whereby, for example, either the front or rear end of an automobile 74 may be lifted from the roadway 76, and said automobile towed, on the pair of wheels thereof still engaging the roadway, by movement of truck 2. The tow-lift tool as illustrated consists of a tool holder including an A-frame 78 having a pair of upwardly converging side bars 80 each detachably but rigidly attached at its lower end to the rearwardly projecting end portion of one of lift arms 32, said side bars being rigidly joined by cross bars 82, and rigidly affixed at their upper ends to a tubular sleeve 84. When lift arm 30 is in its fully elevated position, A-frame 78 is inclined upwardly and rearwardly, and sleeve 84 is disposed vertically, as shown in solid lines in FIG. 1. a spindle 86 is carried rotatably in sleeve 84, being secured therein by a collar 88 affixed thereon at the lower end of said sleeve, and a horizontal cross bar 90 is affixed at its midpoint to the upper end of said spindle, above said sleeve. An upwardly opening chain hook 92 is affixed in each end of cross bar 90. A pair of linked chains 94 are engageable respectively in hooks 92, and have their corresponding ends connected to a horizontal angle iron 96 extending transversely behind sleeve 84. Attached fixedly to the respective ends of angle iron 96 are a pair of broad, strong straps 98 of canvas, belting material or the like. Said straps extend under the rear bumper 100 of automobile 74 (assuming that the rearward end of said automobile is to be elevated) and forwardly beneath said automobile. While not shown, it will be understood that the opposite or forward ends of straps 98 are equipped with angle iron and chains similar to angle iron 96 and chains 94, by means of which they may be attached to an axle or some other convenient portion of the automobile. Sling lifts such as constituted by straps 98 are already in common usage.

Since A-frame 78 extends upwardly behind tail gate 8 of the truck when the lift is elevated, and since in this position it would interfere with the opening of said tail gate and the normal loading of cargo into the truck bed, it is desirable that said A-frame be readily detachable from lift arms 32. When it is detached the basic elements of the lift mounted beneath the truck bed in no way interfere with normal usage of the truck. The means for attaching the A-frame to the lift arms is best shown in FIGS. 5–7. The lower or forward end of each side bar 80 of the A-frame is angled to abut squarely against the rearward end of its associated lift arm 32, and a pair of plates 102 welded to the respectively opposite sides of said side bar extend slidably forwardly along the opposite sides of the associated lift arm. A pin 104 extending horizontally and transversely between plates 102, and rigidly fixed in said plates, is engaged in a semi-circular notch 106 formed in the upper edge of arm 32. A tongue member 108 is rigidly affixed between plates 102 below arm 32, and extends forwardly from said plates. A latch lever 110 is pivoted to arm 32 just above tongue 108 on a horizontal transverse axis, as by pin 112. At its lower end, lever 110 carries a finger 114 which normally extends beneath tongue 108 to lock A-frame 78 in assembly with the lift arm. Lever 110 may be pivoted forwardly, however, as indicated by arrow 116 in FIG. 5, to disengage finger 114 from tongue 108. Thereupon A-frame 78 may be pivoted forwardly on pin 104, and lifted away from arm 30. The A-frame is attached by engaging pins 104 in notches 106, with said A-frame tilted forwardly from its normal position relative to the lift arm, then pivoted rearwardly on said pins till tongues 108 engage the lower edges of arms 32. During this movement, said tongues engage levers 110 and pivot them forwardly until said tongues engage the arms, whereupon lever fingers 114 return by gravity to their locking positions beneath said tongues. Latch levers 110 thereupon remain in their engaged positions until manually released when it is next desired to dismount the A-frame from the lift.

In operation, it will be seen that whenever the control system of ram 38 is conditioned to allow exhausting of hydraulic fluid from cylinder 40 through hose 46, the weight of lift arm 30, A-frame 78 and any load supported thereby will exhaust said fluid, causing the ram to retract and the lift arm to be lowered to the dotted line position of FIG. 1, in which A-frame 78 is disposed substantially horizontally and closely adjacent road surface 76. Sling straps 98 may then be affixed to automobile 74 or the like as previously described, and chains 94 engaged in hooks 92. To elevate the load, hydraulic fluid is supplied to cylinder 40 to force piston rod 44 and pin 48 rearwardly, the movement of pin 48 being horizontal due to the engagement of rollers 54 in channel guides 56. This causes link 50 to pivot lift arm 30 upwardly and rearwardly to its elevated position as shown in solid lines in FIG. 1, and thus elevates any load supported by A-frame 78, in this case automobile 74.

The principal features of the present invention as in the relationship of lift arm 30, ram 38, and the linkage by which they are operatively connected, whereby all of the lift parts may be disposed at maximum elevation above road surface 76, an obvious advantage in connection with pick-up trucks wherein the ground clearance of the truck bed is normally limited, and which nonetheless preserves an efficient power ratio between the operation of the ram and the motion of the lift arm. This ratio may be defined as the ratio between successive increments of motion of the ram and the increments of angular movement of lift arm 32 produced thereby. This power ratio determines the "mechanical advantage" of the ram relative to the load it must support, and it is generally desirable to maintain this ratio as uniform as possible throughout the entire stroke of the ram. Otherwise, as in linkages wherein the power ratio varies radically and therefore provides the ram with a low mechanical advantage at portions of its stroke, the ram would necessarily be designed and powered to support the load even during these periods of low mechanical advantage, and would therefore be larger or operated by more powerful pumps, than are necessary during the portions of its stroke in which it has a better mechanical advantage. Such "over-powering" is of course costly.

Considering FIG. 1, and assuming that ram 38 were connected directly to lift arm 30 rather than to link 50, it will be seen that each increment of movement of the ram would produce a successively greater increment of angular movement of arm 30, with a corresponding drop in mechanical advantage. In fact, as shown the ram could never then elevate arm 30 to its fully elevated position. This defect of power ratio could be corrected by lowering the fixed end of the ram (i.e. pivot 42) sufficiently, ideally to a point on a line at right angles to a line bisecting the angle between the fully lowered and fully elevated positions of lift arm 30. However, this would place the fixed end of the ram cylinder dangerously close to, or even below, the road surface, and this of course cannot be permitted.

The present structure solves the difficulty by providing that lift arm 30 is driven not from a fixed point, as it would be from pivot 42 if the ram were connected directly to said arm, but from a moving point (i.e. pivot 48) which moves in such a manner that the angularity of link 50 to arm 30 is maintained generally uniform. That is, it will be seen first that each increment of extension of the ram causes an approximately equal movement of pin 48 and rollers 54 in guides 56, due to the comparatively great length and small angular movement of said ram. Such angular movement could be eliminated entirely if the ram were aligned accurately with guides 56, but moving ram pivot 42 still higher, as shown, provides better ground clearance and introduces no appreciable variation into the power ratio. Second, the movement of pin 48 under the guidance of rollers 54 and guides 56 tends to maintain link 50 at a generally uniform angle to lift arm 30, so that each equal increment of movement of pin 48 tends to produce an equal increment of angular movement of arm 30. Thus the power ratio and mechanical advantage tend to remain constant, and the ram need not be over-powered to compensate for positions of low mechanical advantage.

Actually, the structure shown does not provide the described 1 to 1 power ratio between the movement of the ram and the angular movement of arm 30 precisely. Although this ratio could be obtained more precisely by curving guide 56 concentrically with shaft 26, the variation therefrom is intentional. As shown, with guides 56 straight and horizontal, link 50 is angled somewhat more acutely to arm 30 at the beginning of its elevation than it is when said arm is fully elevated. This provides that the ram has a somewhat greater mechanical advantage in raising said arm in the upper portion of its movement. This is desirable in many lifting operations. For example, with the tow truck device as shown, it provides greater lifting power as automobile 74 is lifted to actually raise the wheels thereof off of the ground, when maximum load-carrying power is required. During the initial portions of the lift, the automobile is supported partially by its own wheel suspension springs, and less lifting power is required.

While I have shown and described a specific embodiment of my invention, it will be readily apparent that many minor changes of structure and operation could be made without departing from the spirit of the invention.

What I claim as new and desire to protect by Letters Patent is:

1. A hydraulic utility lift for trucks comprising:
   a. a lift frame adapted to be affixed to the truck beneath the rearward portion of the truck bed,
   b. a lift arm pivoted to said frame on a horizontal transverse axis for movement from a downwardly and rearwardly inclined lowered position to a generally horizontal rearwardly extending raised position,
   c. a hydraulic ram extending longitudinally of said frame and pivoted at its forward end to said frame on a horizontal transverse axis spaced forwardly from the pivotal axis of said lift arm,
   d. guide means carried fixedly by said frame and limiting the rearward end of said ram to generally horizontal movement along a horizontal line spaced below the pivotal axis of said lift arm,
   e. a link pivoted at its forward end to the rearward end of said ram and at its rearward end to said lift arm, in rearwardly spaced relation from the pivotal axis of said lift arm,
   f. a tool support, and
   g. means for attaching said tool support to the rearward end of said lift arm.

2. The structure as recited in claim 1 wherein the vertical spacing between said arm pivot and the rearward end of said ram is substantially less than the longitudinal length of said ram, and wherein the forward end of said ram is pivoted to said frame at a point at least as high as the rearward end of said ram.

3. The structure as recited in claim 1 wherein the length of said link is greater than the vertical spacing between the rearward end of said ram and the pivotal axis of said lift arm.

4. The structure as recited in claim 1 wherein said guide means is operable to cause the rearward end of said hydraulic ram to move gradually farther away from the pivotal axis of said lift arm as said lift arm is elevated, whereby the angle of said link to said lift arm is gradually increased as said lift arm is raised, and the mechanical advantage of said link relative to said lift arm consequently gradually increased.

5. The structure as recited in claim 1 with the addition of a manually operable latch carried by said frame and operable to engage and secure said lift arm in its raised position independently of said hydraulic ram.

6. The structure as recited in claim 1 wherein said lift arm extends rearwardly to a position generally flush with the rearward end of the bed of said truck, wherein said tool support extends upwardly behind said truck bed when said lift arm is raised, and wherein said attaching means for said tool support is readily detachable to permit dismounting of said tool support.

7. The structure as recited in claim 6 wherein said attaching means comprises:
   a. a pin fixed in said tool support and engageable freely and pivotally in a notch formed therefor in said lift arm when said tool support is angled on said pin away from its normal position relative to said lift arm,
   b. a tongue member carried fixedly by said tool support and operable to engage said lift arm to prevent disengagement of said pin from said notch when said tool support is pivoted on said pin to its normal position relative to said lift arm, and
   c. a gravity-actuated latch member carried by said lift arm and operable to engage and secure said tongue in its normal position relative to said lift arm, said latch member being manually releaseable.

8. The structure as recited in claim 1 wherein said tool support comprises:
   a. a frame extending upwardly and rearwardly from the rearward end of said lift arm when said arm is raised,
   b. a sleeve affixed to the rearward end of said frame and disposed vertically when said lift arm is in its raised position,
   c. a spindle disposed coaxially and rotatably in said sleeve, and
   d. a load-supporting tool carried by said spindle.

* * * * *